US008316197B1

(12) United States Patent
Parker et al.

(10) Patent No.: US 8,316,197 B1
(45) Date of Patent: Nov. 20, 2012

(54) TECHNIQUES FOR STORAGE LIFECYCLE POLICY MANAGEMENT

(75) Inventors: Dennis Craig Parker, Burnsville, MN (US); Claudia Lynne Rudolph, Medina, MN (US); Deepak Meghraj Patil, Roseville, MN (US)

(73) Assignee: Symantec Corporation, Mountain View, CA (US)

( * ) Notice: Subject to any disclaimer, the term of this patent is extended or adjusted under 35 U.S.C. 154(b) by 332 days.

(21) Appl. No.: 12/714,756

(22) Filed: Mar. 1, 2010

(51) Int. Cl.
 *G06F 12/00* (2006.01)
(52) U.S. Cl. ............ 711/162; 711/4; 711/100; 711/161; 711/165; 711/170; 707/640; 707/641; 707/665; 707/672; 707/673; 726/1; 726/2; 726/4
(58) Field of Classification Search .......... 711/161–162, 711/165, 170; 707/1, 100, 104.1, 204, 640, 707/641, 665, 672, 673; 726/1, 2, 4
See application file for complete search history.

(56) References Cited

U.S. PATENT DOCUMENTS

| | | | | |
|---|---|---|---|---|
| 7,233,959 B2 * | 6/2007 | Kanellos et al. | ...................... | 1/1 |
| 7,392,234 B2 * | 6/2008 | Shaath et al. | ......................... | 1/1 |
| 7,680,830 B1 * | 3/2010 | Ohr et al. | ................... | 707/999.2 |
| 7,757,268 B2 * | 7/2010 | Gupta et al. | ...................... | 726/1 |
| 7,831,563 B2 * | 11/2010 | Brown et al. | ................. | 707/648 |
| 7,979,649 B1 * | 7/2011 | Thiam et al. | .................. | 711/161 |
| 7,987,325 B1 * | 7/2011 | Patil et al. | ...................... | 711/161 |
| 2006/0259901 A1 * | 11/2006 | Kaplan | ......................... | 717/168 |

OTHER PUBLICATIONS

R. Atkinson, et al., "UDDI Version 2.03 Replication Specification; UDDI Committee Specification, Jul. 19, 2002," Oasis; UDDI Spec TC; found at http://uddi.org/pubs/Replication-V2.03-Published-20020719.htm; 41 pages.

* cited by examiner

*Primary Examiner* — Tuan Thai
*Assistant Examiner* — Zhuo Li
(74) *Attorney, Agent, or Firm* — Wilmer Cutler Pickering Hale and Dorr LLP (57) ABSTRACT

Techniques for storage lifecycle policy management. In one particular exemplary embodiment, the techniques may be realized as a method for storage lifecycle policy management comprising creating a version of a storage lifecycle policy, associating a unique version ID with the created version of the storage lifecycle policy, associating the unique version ID with one or more portions of backup data created during a storage management job instantiated under the created version of the storage lifecycle policy, and ensuring that one or more storage management actions performed on the one or more portions of backup data comply with the created version of the storage lifecycle policy associated with unique version ID.

17 Claims, 5 Drawing Sheets

TECHNIQUES FOR STORAGE LIFECYCLE POLICY MANAGEMENT

FIELD OF THE DISCLOSURE

The present disclosure relates generally to storage management and, more particularly, to techniques for storage lifecycle policy management.

BACKGROUND OF THE DISCLOSURE

Storage lifecycle policies may determine the behavior of stored data such as, for example, replicated data, archived data, and backup data. A storage lifecycle policy may determine a series of actions and/or a schedule for storage management actions including when to backup data, when to duplicate data, when to archive data, which storage destinations to use, what type of data retention to use, what data classification to use, and other settings. A storage lifecycle policy may provide rules implemented by hundreds or thousands of other policies (e.g., backup policies, archive policies, etc.). Storage management needs change. For example, a device scheduled by a storage lifecycle policy to duplicate backup images may break. An administrator may desire to change a storage lifecycle policy to use a different duplication device for the images. However, some changes to a storage lifecycle policy may adversely affect stored data being processed under the storage lifecycle policy. For example, backup images may be scheduled to be duplicated to a destination removed by a storage lifecycle policy modification. These images may subsequently expire without being duplicated which may result in a loss of data. Many other complications may arise, so users may not modify a storage lifecycle policy if any data associated with the storage lifecycle policy is being processed. However, if storage management needs change (e.g., a backup or duplication device breaks) the problem may need to be addressed. This may result in a user having to create a new storage lifecycle policy and having to assign multiple jobs (e.g., backup jobs) to the new storage lifecycle policy. In addition to reassigning multiple jobs to a storage lifecycle policy a user may then have to manage multiple storage lifecycle policies.

In view of the foregoing, it may be understood that there may be significant problems and shortcomings associated with current storage lifecycle policy management.

SUMMARY OF THE DISCLOSURE

Techniques for storage lifecycle policy management are disclosed. In one particular exemplary embodiment, the techniques may be realized as a method for storage lifecycle policy management comprising creating a version of the storage lifecycle policy, associating a unique version ID with the created version of the storage lifecycle policy, associating the unique version ID with one or more portions of backup data created during a storage management job instantiated under the created version of the storage lifecycle policy, and ensuring that one or more storage management actions performed on the one or more portions of backup data comply with the created version of the storage lifecycle policy associated with unique version ID.

In accordance with other aspects of this particular exemplary embodiment, the one or more portions of backup data may comprise backup images.

In accordance with further aspects of this particular exemplary embodiment, the one or more storage management actions may comprise at least one of: a data backup action, a data archive action, a data compression action, a data transfer action, a data replication action, and a data modification action.

In accordance with additional aspects of this particular exemplary embodiment, the techniques may further comprise receiving a request to modify the created version of the storage lifecycle policy, ensuring that one or more modifications identified in the request do not disrupt processing of one or more backup images associated with the created version of the storage lifecycle policy, and modifying the created version of the storage lifecycle policy.

In accordance with additional aspects of this particular exemplary embodiment, one or more modifications identified in the request may comprise at least one of: a change to a duplication priority, a change to a storage unit to be used for a destination, a volume pool to be used for a destination, a server group to be used for a destination, a retention level to be used for a destination, an alternate read server to be used for a destination, and an option preserving multiplexing for duplication copies.

In accordance with additional aspects of this particular exemplary embodiment, ensuring that one or more modifications identified in the request do not disrupt processing of one or more backup images may comprise one or more of: ensuring that modification does not change a type of job destination, ensuring that modification does not change a retention type for a destination, ensuring that modification does not change a source of a destination, ensuring that modification does not change a data classification specified in the created version of the storage lifecycle policy, and ensuring that modification does not change a number of destinations specified in the created version of the storage lifecycle policy.

In accordance with additional aspects of this particular exemplary embodiment, the type of destination may comprise at least one of: backup, snapshot, and duplication.

In accordance with additional aspects of this particular exemplary embodiment, the retention type for the destination may comprise at least one of: fixed, capacity managed, and expire after duplication.

In accordance with additional aspects of this particular exemplary embodiment, ensuring that one or more modifications identified in the request do not disrupt processing of one or more backup images associated with the created version of the storage lifecycle policy may comprise processing the one or more backup images according to instructions in the created version of the storage lifecycle policy prior to modification for one or more processing steps currently in progress, and processing the one or more backup images according to instructions in the created version of the storage lifecycle policy after modification for one or more processing steps not yet in progress.

In accordance with additional aspects of this particular exemplary embodiment, one or more processing steps not yet in progress may comprise one or more processing steps not running or queued to run.

In accordance with additional aspects of this particular exemplary embodiment, the techniques may further comprise receiving a request to create a new version of the storage lifecycle policy, creating the new version of the storage lifecycle policy, associating a unique version ID with the new version of the storage lifecycle policy, and ensuring that one or more storage management actions performed on one or more backup images of a job instantiated under the new version of the storage lifecycle policy comply with the new version of the storage lifecycle policy.

In accordance with additional aspects of this particular exemplary embodiment, the techniques may further comprise ensuring that all jobs instantiated under a storage lifecycle policy use a version of the storage lifecycle policy with a latest creation date.

In accordance with additional aspects of this particular exemplary embodiment, the techniques may further comprise receiving a request to delete an identified version of the storage lifecycle policy, analyzing one or more portions of storage management job data to determine whether an incomplete storage management job is associated with the identified version of the storage lifecycle policy, deleting the identified version of the storage lifecycle policy, in the event that no incomplete jobs are associated with the identified version of the storage lifecycle policy, and denying the request, in the event that an incomplete job is associated with the identified version of the storage lifecycle policy.

In accordance with additional aspects of this particular exemplary embodiment, the techniques may be realized as at least one processor readable storage medium for storing a computer program of instructions configured to be readable by at least one processor for instructing the at least one processor to execute a computer process for performing the method.

In another particular exemplary embodiment, the techniques may be realized as an article of manufacture for storage lifecycle policy management, the article of manufacture comprising at least one processor readable medium, and instructions stored on the at least one medium. The instructions may be configured to be readable from the at least one medium by at least one processor and thereby cause the at least one processor to operate so as to create a version of a storage lifecycle policy, associate a unique version ID with the created version of the storage lifecycle policy, associate the unique version ID with one or more portions of backup data created during a storage management job instantiated under the created version of the storage lifecycle policy, and ensure that one or more storage management actions performed on the one or more portions of backup data comply with the created version of the storage lifecycle policy associated with unique version ID.

In yet another particular exemplary embodiment, the techniques may be realized as a system for storage lifecycle policy management comprising one or more processors communicatively coupled to a network. The one or more processors may be configured to create a version of a storage lifecycle policy, associate a unique version ID with the created version of the storage lifecycle policy, associate the unique version ID with one or more portions of backup data created during a storage management job instantiated under the created version of the storage lifecycle policy, and ensure that one or more storage management actions performed on the one or more portions of backup data comply with the created version of the storage lifecycle policy associated with unique version ID.

In accordance with additional aspects of this particular exemplary embodiment, one or more portions of backup data may comprise backup images.

In accordance with additional aspects of this particular exemplary embodiment, the processors may be further configured to receive a request to modify the created version of the storage lifecycle policy, ensure that one or more modifications identified in the request do not disrupt processing of one or more backup images associated with the created version of the storage lifecycle policy, and modify the created version of the storage lifecycle policy.

In accordance with additional aspects of this particular exemplary embodiment, the processors may be further configured to receive a request to create a new version of the storage lifecycle policy, create the new version of the storage lifecycle policy, associate a unique version ID with the new version of the created storage lifecycle policy, and ensure that one or more storage management actions performed on the one or more backup images of a job instantiated under the new version of the created storage lifecycle policy comply with the new version of the storage lifecycle policy.

In accordance with additional aspects of this particular exemplary embodiment, the processors may be further configured to receive a request to delete an identified version of the storage lifecycle policy, analyze one or more portions of storage management job data to determine whether an incomplete storage management job is associated with the identified version of the storage lifecycle policy, delete the identified version of the storage lifecycle policy, in the event that no incomplete jobs are associated with the identified version of the storage lifecycle policy, and deny the request, in the event that an incomplete job is associated with the identified version of the storage lifecycle policy.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
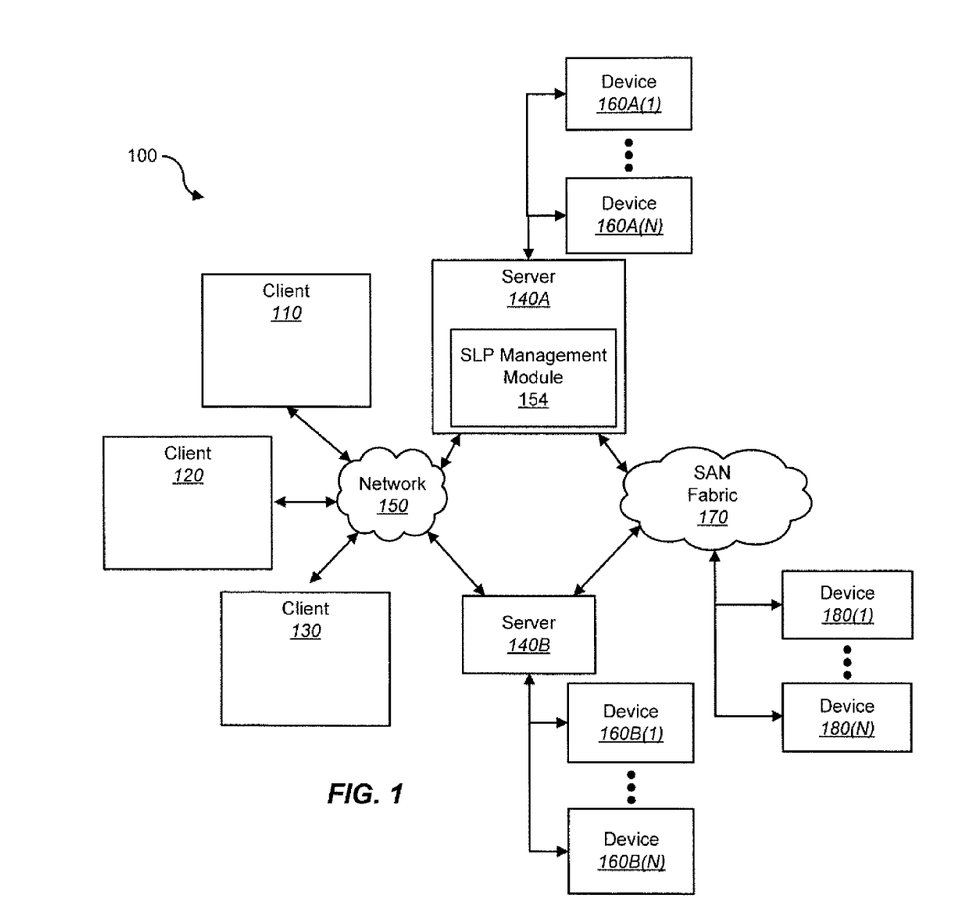
FIG. 1 shows a block diagram depicting a network architecture for storage lifecycle policy management in accordance with an embodiment of the present disclosure.

FIG. 1 shows a block diagram depicting a network architecture 100 for storage lifecycle policy management in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., storage lifecycle policy management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
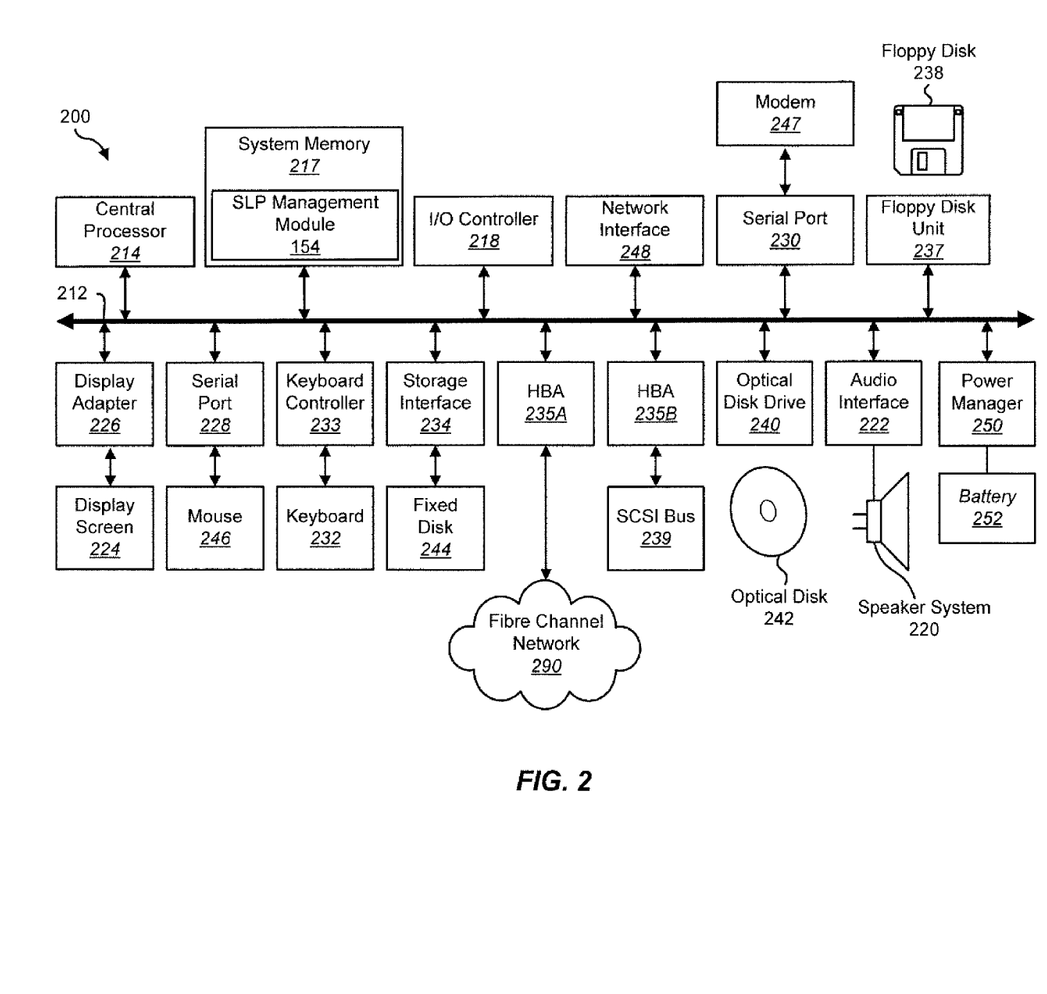
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Network 150 may be a local area network (LAN), a wide area network (WAN), the Internet, a cellular network, a satellite network, or another network that permits communication between clients 110, 120, 130, servers 140, and other devices communicatively coupled to network 150. Network 150 may further include one, or any number, of the exemplary types of networks mentioned above operating as a stand-alone network or in cooperation with each other. Network 150 may utilize one or more protocols of one or more clients or servers to which it is communicatively coupled. Network 150 may translate to or from other protocols to one or more protocols of network devices. Although network 150 is depicted as one network, it should be appreciated that according to one or more embodiments, network 150 may comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140E may be hosts, such as an application server, which may process data traveling between clients 110, 120, and 130 and a backup platform, a backup process, and/or storage. According to some embodiments, servers 140A and 140E may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may backup data, archive data, or perform one or more other storage management actions based on a storage management lifecycle policy supplied by a storage management server.

Storage lifecycle policy management module 154 may allow creation, modification, and/or deletion of versions of one or more storage lifecycle policies. Storage lifecycle policy management module 154 may associate a version of a storage lifecycle policy with one or more portions of backup data. Storage lifecycle policy management module 154 may associate an identifier with one or more portions of data. For example, an identifier, such as a unique version ID, may be inserted in or appended to a backup image. The unique version ID may be in a backup file (e.g., in header data of a backup image) which may include other information such as a storage lifecycle policy name. According to some embodiments, a unique identifier may identify both a storage lifecycle policy and a storage lifecycle policy version. Storage lifecycle policy management module 154 may ensure that one or more storage management actions such as, for example, a data backup action, a data archive action, a data compression action, a data transfer action, a data replication action, and a data modification action, are governed by storage lifecycle policy. The storage lifecycle policy and version may be identified by one or more unique identifiers associated with backup data.

In at least one embodiment, a table, or other data structure external to the backup data may map identifying attributes of backup data to a storage lifecycle policy and a version of that policy. According to another embodiment, a portion of backup data may contain embedded or appended storage lifecycle policy instructions which may be used to manage the storage lifecycle policy for that backup data.

Storage lifecycle policy management module 154 may receive, verify, and manage modifications to a storage lifecycle policy version. Storage lifecycle policy management module 154 may receive a request to modify the version of the storage lifecycle policy and may ensure that one or more modifications identified in the request do not disrupt processing of one or more backup images associated with the version of the storage lifecycle policy. If the requested modification does not disrupt processing of one or more backup images associated with the version of the storage lifecycle policy, storage lifecycle policy management module 154 may modify the storage lifecycle policy. Storage lifecycle policy management module 154 may deny a request if a modification to a storage lifecycle policy would disrupt processing of stored data such as backup images.

According to some embodiments, storage lifecycle policy management module 154 may provide a user interface which may only provide storage lifecycle policy version modification options or may only accept storage lifecycle policy version modification commands which do not disrupt processing of data associated with that version of the storage lifecycle policy. Storage lifecycle policy management module 154 may contain or access a list or other data structure of permissible version modifications. Permissible version modifications may be made to a version of a storage lifecycle policy which currently has data associated with that is undergoing one or more storage management actions. Permissible modifications may include, by way of non-limiting example, a change to a duplication priority, a change to a storage unit to be used for a destination, a volume pool to be used for a destination, a server group to be used for a destination, a retention level to be used for a destination, an alternate read server to be used for a destination, and an option preserving multiplexing for duplication copies. According to some embodiments, storage lifecycle policy management module 154 may deny a request for a storage lifecycle policy modification that disrupts processing or may direct a user to create a new version of a storage lifecycle policy. If a requested modification to a storage lifecycle policy is not a modification known by storage lifecycle policy management module 154 to be permissible, storage lifecycle policy management module 154 may perform one or more alternate actions. For example, storage lifecycle policy management module 154 may cache a request that may disrupt processing of one or more portions of data for later processing, may identify one or more jobs associated with a storage lifecycle process version to be modified, and may identify the status of the jobs and associated data. According to some embodiments, if no jobs are currently in-process or scheduled for a version of a storage lifecycle policy, storage lifecycle policy management module 154 may permit modifications that would disrupt processing of in-progress storage management jobs. In such an embodiment, storage lifecycle policy management module 154 may temporarily freeze or disable creation of a job to be associated with a storage lifecycle policy version until modifications to the storage lifecycle policy version are complete. Storage lifecycle policy management module 154 may identify backup data associated with a storage lifecycle policy version and may verify the status of such backup data prior to permitting such changes.

According to at least one embodiment, storage lifecycle policy management module 154 may contain or access a list or other data structure of impermissible modifications to a storage lifecycle policy version. Impermissible storage lifecycle policy versions may include, by way of non-limiting example, changing a type of job destination (e.g., backup, snapshot, and duplication), changing a retention type for a destination (e.g., fixed, capacity managed, and expire after duplication), changing a source of a destination, changing a data classification of the version, and changing a number of destinations of the version of a storage lifecycle policy.

Storage lifecycle policy management module 154 may manage one or more portions of storage management jobs in progress while an associated storage lifecycle policy version is modified. For example, a storage management job may be comprised of a plurality of steps or jobs. A storage management job may generate backup images, duplicate backup images, archive backup data images, compress backup data images, expire backup data images, and perform other steps or jobs. If backup data associated with a storage lifecycle policy version being modified is being processed, whether changes to a storage lifecycle policy version are utilized by a job may depend on the step or portion of the job running. According to some embodiments, if a step of a storage lifecycle policy is in progress prior to completion of a modification of that step in the storage lifecycle policy version, the step may use instructions from the storage lifecycle policy prior to the change. For example, if a storage unit for a backup destination is modified and the backup data is being transferred to the backup destination, the change may not take effect until the next job. If backup images are being generated and a step transferring the backup images has not yet begun and/or has not been queued, the backup images may be transferred to the storage unit indicated in the modified storage lifecycle policy. According to some embodiments, if any step of a storage management job is in progress and/or has been queued, all steps may follow instructions of a storage lifecycle policy version prior to a change of the storage lifecycle policy version begun after a start of the storage management job.

Storage lifecycle policy management module 154 may handle one or more requests for creation of a new version of a storage lifecycle policy. Storage lifecycle policy management module 154 may provide a user interface allowing modifications to storage lifecycle policy details or steps. A unique version number may be assigned to a new storage lifecycle policy version. The unique version number may not be associated with any backup data until creation of the storage lifecycle policy version is complete, which may allow modification to one or more details of a storage lifecycle policy that may not be modified in a version associated with in-progress data. According to some embodiments, all jobs instantiated under a storage lifecycle policy may use a most recent version of the storage lifecycle policy. According to at least one embodiment, a user may specify which version of a storage lifecycle policy to use when requesting a storage management job.

Storage lifecycle policy management module 154 may also handle requests for deletion of a storage lifecycle policy version. Storage lifecycle policy management module 154 may identify and analyze one or more portions of storage management job data to determine whether an incomplete storage management job is associated with the version of the storage lifecycle policy. Storage lifecycle policy management module 154 may delete the version of the storage lifecycle policy, in the event that no incomplete jobs are associated with the version of the storage lifecycle policy. Storage lifecycle policy management module 154 may deny a deletion request, in the event that an incomplete job is associated with the version of the storage lifecycle policy.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, storage lifecycle policy management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Exemplary storage lifecycle policy management is disclosed in a document published by Symantec Corporation, titled "Veritas NetBackup™, Documentation Updates, NetBackup 6.5.5," Nov. 2, 2009, and a document published by Symantec Corporation, titled "Best Practices for Using Storage Lifecycle Policies," Symantec TechNote 334042, Dec. 15, 2009, the content of both documents is hereby incorporated by reference in their entireties.

Figure 3:
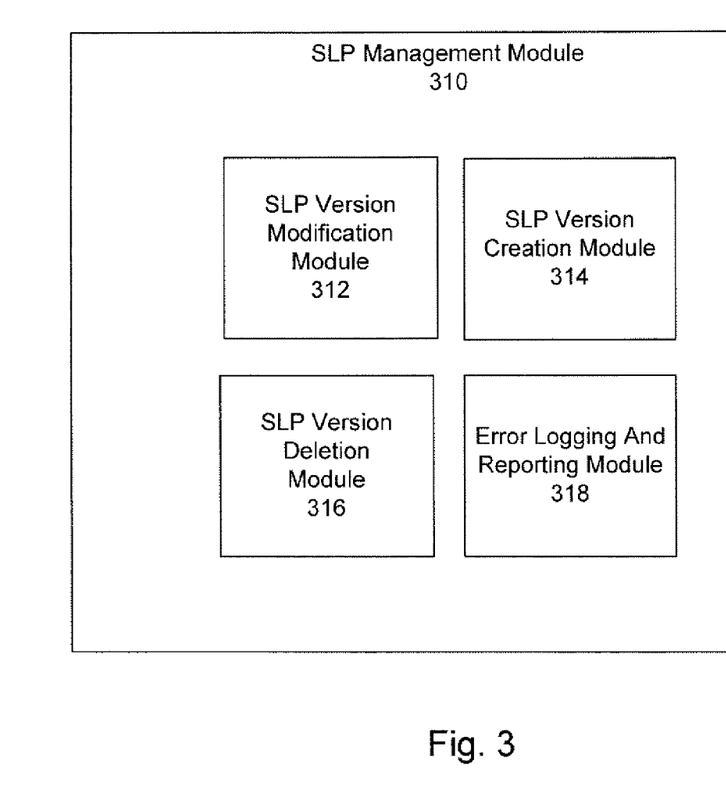
FIG. 3 shows a module for storage lifecycle policy management in accordance with an embodiment of the present disclosure.

Referring to FIG. 3, there is shown a storage lifecycle policy management 310 in accordance with an embodiment of the present disclosure. As illustrated, the storage lifecycle policy management 310 may contain one or more components including storage lifecycle policy version modification module 312, storage lifecycle policy version creation module 314, storage lifecycle policy deletion module 316, and error logging and reporting module 318.

The description below describes network elements, computers, and/or components of a system and method for storage lifecycle policy management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Storage lifecycle policy version modification module 312 may receive, verify, and manage modifications to a storage lifecycle policy version. Storage lifecycle policy version modification module 312 may receive a request to modify the version of the storage lifecycle policy and may ensure that one or more modifications identified in the request do not disrupt processing of one or more backup images associated with the version of the storage lifecycle policy. If the requested modification does not disrupt processing of one or more backup images associated with the version of the storage lifecycle policy, storage lifecycle policy version modification module 312 may modify the storage lifecycle policy. Storage lifecycle policy version modification module 312 may deny a request if a modification to a storage lifecycle policy would disrupt processing of stored data such as backup images. According to some embodiments, storage lifecycle policy version modification module 312 may provide a user interface which may only provide storage lifecycle policy version modification options or may only accept storage lifecycle policy version modification commands which do not disrupt processing of data associated with that version of the storage lifecycle policy. Storage lifecycle policy version modification module 312 may contain or access a list or other data structure of permissible version modifications. Permissible version modifications may be made to a version of a storage lifecycle policy which currently has data associated with it that is undergoing one or more storage management actions. Permissible modifications may include, by way of non-limiting example, a change to a duplication priority, a change to a storage unit to be used for a destination, a volume pool to be used for a destination, a server group to be used for a destination, a retention level to be used for a destination, an alternate read server to be used for a destination, and an option preserving multiplexing for duplication copies. According to some embodiments, storage lifecycle policy version modification module 312 may deny a request for a storage lifecycle policy modification that disrupts processing or may direct a user to create a new version of a storage lifecycle policy. If a requested modification to a storage lifecycle policy is not a modification known by storage lifecycle policy version modification module 312 to be permissible, storage lifecycle policy version modification module 312 may perform one or more alternate actions. For example, storage lifecycle policy version modification module 312 may cache a request that may disrupt processing of one or more portions of data for later processing, may identify one or more jobs associated with a storage lifecycle process version to be modified, and may identify the status of the jobs and associated data. According to some embodiments, if no jobs are currently in-process or scheduled for a version of a storage lifecycle policy version modification module 312 may permit modifications that would disrupt processing of in progress storage management jobs. In such an embodiment, storage lifecycle policy version modification module 312 may temporarily freeze or disable creation of a job to be associated with a storage lifecycle policy version until modifications to the storage lifecycle policy version are complete. Storage lifecycle policy version modification module 312 may identify backup data associated with a storage lifecycle policy version and may verify the status of such backup data prior to permitting such changes.

Storage lifecycle policy version creation module 314 may handle one or more requests for creation of a new version of a storage lifecycle policy. Storage lifecycle policy version creation module 314 may provide a user interface allowing modifications to storage lifecycle policy details or steps. A unique version number may be assigned to a new storage lifecycle policy version. The unique version number may not be associated with any backup data until creation of the storage lifecycle policy version is complete, which may allow modification to one or more details of a storage lifecycle policy that may not be modified in version associated with in-progress data. According to some embodiments, all jobs instantiated under a storage lifecycle policy may use a most recent version of the storage lifecycle policy. According to at least one embodiment, a user may specify which version of a storage lifecycle policy to use when requesting a storage management job.

Storage lifecycle policy deletion module 316 may handle requests for deletion of a storage lifecycle policy version. Storage lifecycle policy deletion module 316 may identify and analyze one or more portions of storage management job data to determine whether an incomplete storage management job is associated with the version of the storage lifecycle policy. Storage lifecycle policy deletion module 316 may delete the version of the storage lifecycle policy, in the event that no incomplete jobs are associated with the version of the storage lifecycle policy. Storage lifecycle policy deletion module 316 may deny the deletion request, in the event that an incomplete job is associated with the version of the storage lifecycle policy.

Error logging and reporting module 318 may produce logs, reports, or other information associated with storage lifecycle policy version management. According to some embodiments, error logging and reporting module 318 may allow retrying of one or more storage lifecycle policy management actions. Error logging and reporting module 318 may provide one or more alerts, warnings, or notifications.

Figure 4:
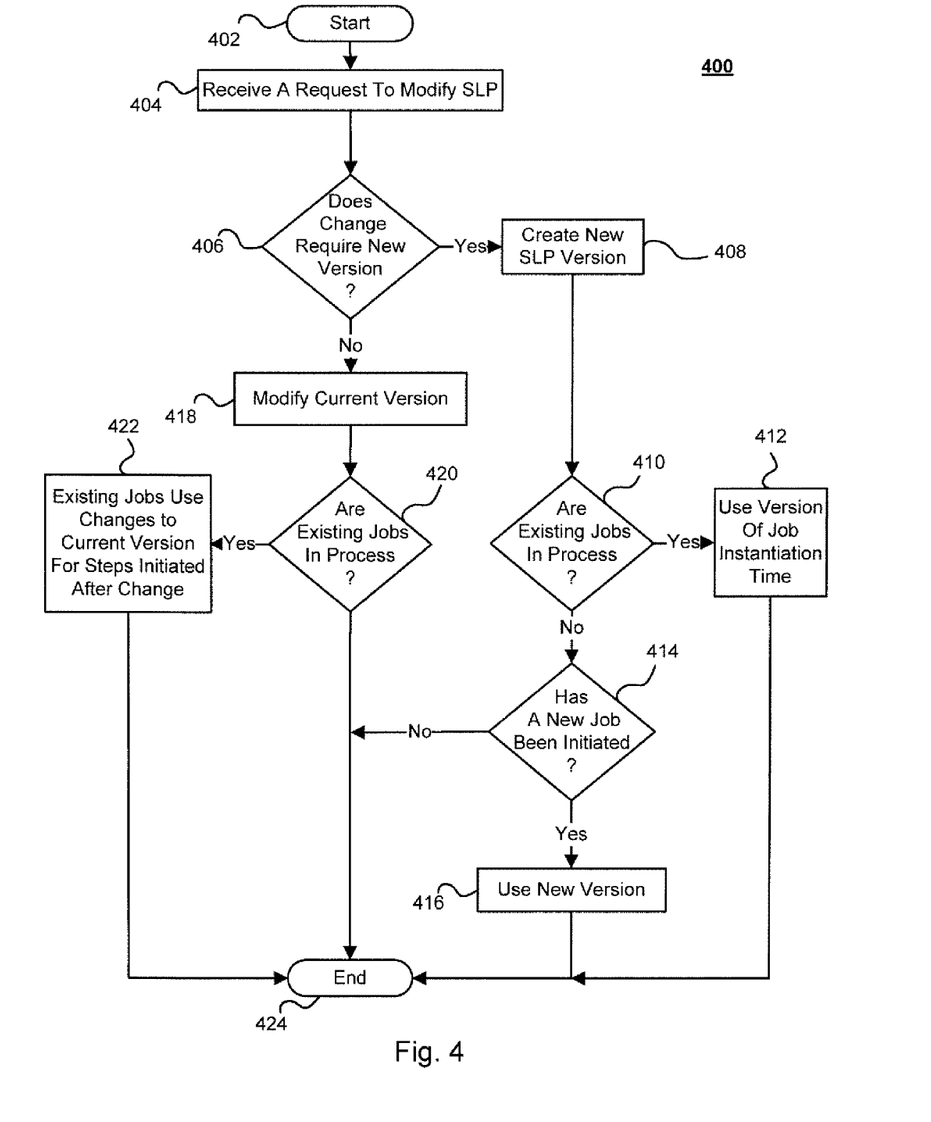
FIG. 4 depicts a method for storage lifecycle policy management in accordance with an embodiment of the present disclosure.

Referring to FIG. 4, there is depicted a method 400 for storage lifecycle policy management in accordance with an embodiment of the present disclosure. At block 402, the method 400 may begin.

At block 404, a request may be received to modify a storage lifecycle policy.

At block 406, it may be determined whether one or more requested modifications require a new version of a storage lifecycle policy. A new version may be required to avoid disruption to one or more storage management jobs associated with a current version and/or to avoid data loss. If a new version of a storage lifecycle policy is required, the method 400 may continue at block 408. If a new version of a storage lifecycle policy is not required, the method 400 may continue at block 418.

At block 408, a new version of a storage lifecycle policy may be created. The new version may have a unique identifier associated with it, a storage lifecycle policy name associated with it, and/or one or more other storage lifecycle policy attributes. These attributes may be stored in an administration catalog including, by way of non-limiting example, a NetBackup™ image catalog. According to some embodiments, stored data such as, for example, backup images may have a unique version identifier, a storage lifecycle policy name, and/or other storage lifecycle policy data. The unique version identifier, storage lifecycle policy name, and/or other data may be written in one or more image headers of backup images associated with a storage lifecycle policy.

At block 410, it may be determined whether existing storage management jobs associated with a storage lifecycle policy are in progress (e.g., running or queued). If an existing storage management job associated with a storage lifecycle policy is in progress (e.g., a backup instantiated under the storage lifecycle policy is running), the method 400 may continue at block 412. If an existing storage management job associated with a storage lifecycle policy is not in progress, the method 400 may continue at block 414.

At block 412, an existing storage management job may continue to process and/or remain queued. The existing storage management job may use a version of the storage lifecycle policy under which the storage management job was instantiated.

At block 414, it may be determined whether a new storage management job has been created. If a new storage management job has been created, the method 400 may continue at block 416. If a new storage management job has not been created, the method 400 may end at block 424.

At block 416, a newly created storage management job may use a most current version of a storage lifecycle policy. According to some embodiments, a user may specify which version of a storage lifecycle policy for a job to use.

At block 418, a current version of a storage lifecycle policy may be modified.

At block 420, it may be determined whether a storage management job associated with the storage lifecycle policy exists and is running and/or queued. If a storage management job associated with the storage lifecycle policy exists, the method 400 may continue at block 422, otherwise the method 400 may end at block 424.

At block 422, one or more existing storage management jobs associated with a storage lifecycle policy version may implement none of the storage lifecycle policy changes or one or more portions of the storage lifecycle policy changes. According to an embodiment, an existing storage management job associated with a storage lifecycle policy may use changes to that version of the storage lifecycle policy for steps which are started and/or queued after completion of a change to the storage lifecycle policy version. For example, if a destination backup storage unit is modified in a storage lifecycle policy version, a job existing prior to the modification may use the new backup storage unit if the change is completed prior to initiation and/or queuing of a step in the job using the backup storage unit (e.g., perhaps the images are being created at the time of the modification, but not yet transferred to the backup destination; in such a case, a new backup storage unit associated with the destination may be used).

Figure 5:
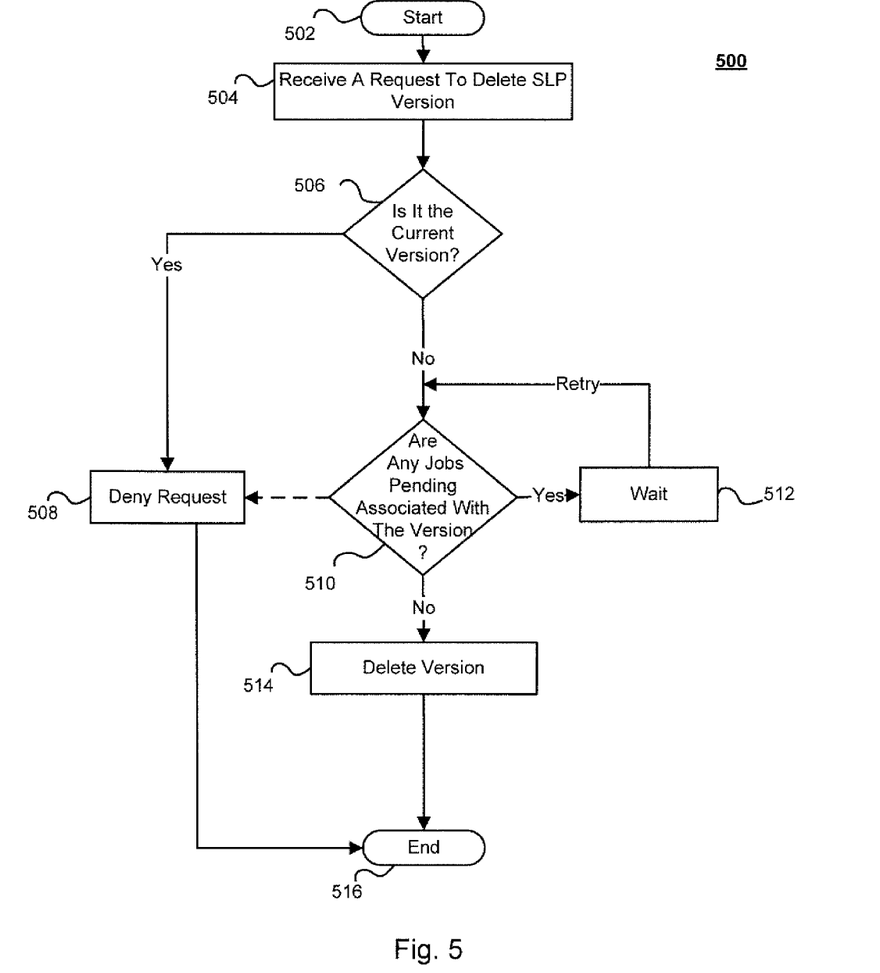
FIG. 5 depicts a method for storage lifecycle policy management in accordance with an embodiment of the present disclosure.

At block 424, the method 400 may end. Referring to FIG. 5, there is depicted a method 400 for storage lifecycle policy management in accordance with an embodiment of the present disclosure. At block 502, the method 500 may begin.

At block 504, a request may be received to delete a storage lifecycle policy version.

At block 506, it may be determined whether the deletion request is for a most recent or current version of a storage lifecycle policy. If so, the method may continue at block 508.

If the deletion request is not for a most recent or current version of a storage lifecycle policy, the method may continue at block 510.

At block 508, according to some embodiments, if the deletion request is for a current version of a storage lifecycle policy, the request may be denied. According to other embodiments, one or more determinations may be made as to whether any pending or running jobs are associated with the current version. If no pending or running jobs are associated with the current version, it may be deleted.

At block 510, it may be determined whether any pending or running jobs are associated with the version to be deleted. If no pending or running jobs are associated with the version to be deleted, the method 500 may continue at block 514. If any pending or running jobs are associated with the version to be deleted, the method 500 may continue at block 512. According to an alternate embodiment, if any jobs are queued or associated with the version of the storage lifecycle policy, the method 500 may continue at block 508.

At block 512, the method 500 may wait for a specified period of time. After the specified period of time the method 500 may continue at block 510.

At block 514, the version of the storage lifecycle policy may be deleted.

At block 516, the method 500 may end.

At this point it should be noted that storage lifecycle policy management in accordance with the present disclosure as described above typically involves the processing of input data and the generation of output data to some extent. This input data processing and output data generation may be implemented in hardware or software. For example, specific electronic components may be employed in a storage lifecycle policy management module or similar or related circuitry for implementing the functions associated with storage lifecycle policy management in accordance with the present disclosure as described above. Alternatively, one or more processors operating in accordance with instructions may implement the functions associated with storage lifecycle policy management in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for storage lifecycle policy management comprising:
   creating a version of a storage lifecycle policy;
   associating a unique version ID with the created version of the storage lifecycle policy;
   associating the unique version ID with one or more portions of backup data created during a storage management job instantiated under the created version of the storage lifecycle policy;
   ensuring that one or more storage management actions performed on the one or more portions of backup data comply with the created version of the storage lifecycle policy associated with the unique version ID;
   receiving a request to modify the created version of the storage lifecycle policy;
   ensuring that one or more modifications identified in the request do not disrupt processing of one or more backup images associated with the created version of the storage lifecycle policy, wherein ensuring that one or more modifications identified in the request do not disrupt processing of one or more backup images comprises one or more of: ensuring that modification does not change a type of job destination; ensuring that modification does not change a retention type for a destination; ensuring that modification does not change a source of a destination; ensuring that modification does not change a data classification specified in the created version of the storage lifecycle policy; and ensuring that modification does not change a number of destinations specified in the created version of the storage lifecycle policy; and
   modifying the created version of the storage lifecycle policy.

2. The method of claim 1, wherein the one or more portions of backup data comprise backup images.

3. The method of claim 1, wherein the one or more storage management actions comprise at least one of: a data backup action, a data archive action, a data compression action, a data transfer action, a data replication action, and a data modification action.

4. The method of claim 1, wherein one or more modifications identified in the request comprises at least one of: a change to a duplication priority; a change to a storage unit to be used for a destination; a volume pool to be used for a destination; a server group to be used for a destination; a retention level to be used for a destination; an alternate read server to be used for a destination; and an option preserving multiplexing for duplication copies.

5. The method of claim 1, wherein the type of destination comprises at least one of: backup, snapshot, and duplication.

6. The method of claim 1, wherein the retention type for the destination comprises at least one of: fixed, capacity managed, and expire after duplication.

7. The method of claim 1, wherein ensuring that one or more modifications identified in the request do not disrupt processing of one or more backup images associated with the created version of the storage lifecycle policy comprises:
   processing the one or more backup images according to instructions in the created version of the storage lifecycle policy prior to modification for one or more processing steps currently in progress; and
   processing the one or more backup images according to instructions in the created version of the storage lifecycle policy after modification for one or more processing steps not yet in progress.

8. The method of claim 7, wherein one or more processing steps not yet in progress comprises one or more processing steps not running or queued to run.

9. The method of claim 1, further comprising:
   receiving a request to create a new version of the storage lifecycle policy;

creating the new version of the storage lifecycle policy;
associating a unique version ID with the new version of the storage lifecycle policy; and
ensuring that one or more storage management actions performed on one or more backup images of a job instantiated under the new version of the storage lifecycle policy comply with the new version of the storage lifecycle policy.

10. The method of claim 9, further comprising ensuring that all jobs instantiated under a storage lifecycle policy use a version of the storage lifecycle policy with a latest creation date.

11. The method of claim 1, further comprising:
receiving a request to delete an identified version of the storage lifecycle policy;
analyzing one or more portions of storage management job data to determine whether an incomplete storage management job is associated with the identified version of the storage lifecycle policy;
deleting the identified version of the storage lifecycle policy, in the event that no incomplete jobs are associated with the identified version of the storage lifecycle policy; and
denying the request, in the event that an incomplete job is associated with the identified version of the storage lifecycle policy.

12. At least one non-transitory processor readable storage medium for storing a computer program of instructions configured to be readable by at least one processor for instructing the at least one processor to execute a computer process for performing the method as recited in claim 1.

13. An article of manufacture for storage lifecycle policy management, the article of manufacture comprising:
at least one non-transitory processor readable medium; and
instructions stored on the at least one medium;
wherein the instructions are configured to be readable from the at least one medium by at least one processor and thereby cause the at least one processor to operate so as to:
create a version of a storage lifecycle policy;
associate a unique version ID with the created version of the storage lifecycle policy;
associate the unique version ID with one or more portions of backup data created during a storage management job instantiated under the created version of the storage lifecycle policy; and
ensure that one or more storage management actions performed on the one or more portions of backup data comply with the created version of the storage lifecycle policy associated with unique version ID;
receive a request to modify the created version of the storage lifecycle policy;
ensure that one or more modifications identified in the request do not disrupt processing of one or more backup images associated with the created version of the storage lifecycle policy, wherein ensuring that one or more modifications identified in the request do not disrupt processing of one or more backup images comprises one or more of: ensuring that modification does not change a type of job destination; ensuring that modification does not change a retention type for a destination; ensuring that modification does not change a source of a destination; ensuring that modification does not change a data classification specified in the created version of the storage lifecycle policy; and ensuring that modification does not change a number of destinations specified in the created version of the storage lifecycle policy; and
modify the created version of the storage lifecycle policy.

14. A system for storage lifecycle policy management comprising:
one or more processors communicatively coupled to a network, wherein the one or more processors are configured to:
create a version of a storage lifecycle policy;
associate a unique version ID with the created version of the storage lifecycle policy;
associate the unique version ID with one or more portions of backup data created during a storage management job instantiated under the created version of the storage lifecycle policy;
ensure that one or more storage management actions performed on the one or more portions of backup data comply with the created version of the storage lifecycle policy associated with unique version ID;
receive a request to modify the created version of the storage lifecycle policy;
ensure that one or more modifications identified in the request do not disrupt processing of one or more backup images associated with the created version of the storage lifecycle policy, wherein ensuring that one or more modifications identified in the request do not disrupt processing of one or more backup images comprises one or more of: ensuring that modification does not change a type of job destination; ensuring that modification does not change a retention type for a destination; ensuring that modification does not change a source of a destination; ensuring that modification does not change a data classification specified in the created version of the storage lifecycle policy; and ensuring that modification does not change a number of destinations specified in the created version of the storage lifecycle policy; and
modify the created version of the storage lifecycle policy.

15. The system of claim 14, wherein the one or more portions of backup data comprise backup images.

16. The system of claim 14, wherein the processors are further configured to:
receive a request to create a new version of the storage lifecycle policy;
create the new version of the storage lifecycle policy;
associate a unique version ID with the new version of the created storage lifecycle policy; and
ensure that one or more storage management actions performed on the one or more backup images of a job instantiated under the new version of the created storage lifecycle policy comply with the new version of the storage lifecycle policy.

17. The system of claim 14, wherein the processors are further configured to:
receive a request to delete an identified version of the storage lifecycle policy;
analyze one or more portions of storage management job data to determine whether an incomplete storage management job is associated with the identified version of the storage lifecycle policy;
delete the identified version of the storage lifecycle policy, in the event that no incomplete jobs are associated with the identified version of the storage lifecycle policy; and
deny the request, in the event that an incomplete job is associated with the identified version of the storage lifecycle policy.

* * * * *